United States Patent [19]

Coleman

[11] 4,445,333
[45] May 1, 1984

[54] VALVE ASSEMBLY

[75] Inventor: John R. Coleman, Dayton, Ohio

[73] Assignee: General Motors Corporation, Detroit, Mich.

[21] Appl. No.: 284,062

[22] Filed: Jul. 16, 1981

[51] Int. Cl.³ .............................................. B60T 11/08
[52] U.S. Cl. ........................................ 60/578; 60/588; 137/513.3; 137/855
[58] Field of Search ................. 60/585, 588, 589, 574, 60/578; 137/527, 513.3, 855, 852

[56] References Cited

U.S. PATENT DOCUMENTS

| | | | |
|---|---|---|---|
| 2,624,414 | 1/1953 | Harrell | 137/855 |
| 3,568,712 | 3/1971 | Rinehart | 137/855 |
| 3,612,098 | 10/1971 | Bora et al. | 137/527 |
| 3,756,357 | 9/1973 | Graff | 137/513.3 |
| 3,926,214 | 12/1975 | Hrabal | 137/856 |
| 4,179,051 | 12/1979 | Thomas | 137/855 |
| 4,208,881 | 6/1980 | Brademeyer | 60/588 |
| 4,266,569 | 5/1981 | Wilson | 137/527.2 |
| 4,303,598 | 12/1981 | Neighbor | 137/513.3 |

*Primary Examiner*—Abraham Hershkovitz
*Attorney, Agent, or Firm*—D. D. McGraw

[57] ABSTRACT

A master cylinder assembly has a low pressure, high volume displacement quick take-up chamber and a high pressure, low volume displacement pressurizing chamber formed by a stepped bore and a stepped piston. A compensation control and blow-off valve unit has a peripheral lip seal type valve providing compensation flow on brake release but preventing flow from the quick take-up chamber during brake apply. A normally closed check valve can open to provide communication between the quick take-up pressurizing chamber and the fluid reservoir. When the pressurizing cup for the high pressure chamber closes its compensation port, the check valve is subjected to the pressure in the quick take-up pressurizing chamber. Initial fluid flow is obtained from the quick take-up chamber past the pressurizing cup into the high pressure chamber. At a predetermined pressure level, arranged to be sufficient to take up lining clearance and initially apply the vehicle brakes, the pressure in the quick take-up chamber opens the normally closed check valve so that fluid from the quick take-up chamber then flows to the reservoir without further pressure buildup in that chamber. As the master cylinder is released, compensation fluid can flow past the peripheral compensation valve to both chambers. When the master cylinder is returned to the fully released position, the check valve is closed. A fluid flow restrictive orifice is provided which bypasses the normally closed check valve to provide a continuous fluid path controlled leak from the quick take-up chamber to the fluid reservoir.

3 Claims, 3 Drawing Figures

VALVE ASSEMBLY

The invention relates to a quick take-up master cylinder and more particularly to one having a compensation control and blow-off valve unit.

A master cylinder embodying the invention utilizes a blow-off valve which permits the buildup of quick take-up pressure to a predetermined point after which the quick take-up chamber is connected to the master cylinder reservoir and the blow-off pressure reduces to substantially, for example, to approximately one-half of its original value. This reduces the portion of the master cylinder actuating force required during the remainder of the stroke to force fluid in the quick take-up chamber through the blow-off valve. A similar arrangement is the subject of U.S. Pat. No. 4,208,881, issued Jun. 24, 1980, over which the invention herein disclosed and claimed is an improvement.

The blow-off valve assembly of that patent has a two-part valve housing formed by a valve seat member and a valve body, a ball check valve and spring, and a cup seal which is somewhat intricately constructed to also act as a seal between the seat member and the body, assisting in joining the two together. The structure to which the invention herein disclosed and claimed is directed has a one-piece stamped element replacing the ball and spring and eliminates the need for a valve seat member separate from the body. The valve chamber required in the structure of the above noted patent is not within the interior of the unit, and much simplification is obtained by employing the invention herein disclosed and claimed. The bypass passage is preferably formed as a part of the valve member, which is a part of the one-piece stamped element. A simpler cup seal may be used.

The quick take-up master cylinder takes up excessive pedal travel by use of a two-stage bore and piston arrangement. It permits the use of increased brake lining clearances, particularly in disc brakes, thus improving gas mileage. It reduces brake pedal effort to manually actuate brakes by using a smaller master cylinder bore diameter for generating high braking pressures after the brake linings have engaged the brake discs or drums. This can remove the requirement of power brake boosters for some cars.

The master cylinder has a stepped bore and a stepped piston defining a large volume chamber and a smaller volume chamber. The large chamber is effective at the beginning of the stroke and in the lower pressure range. It displaces a large volume of fluid at relatively low pressure, which takes up brake lining clearances with a relatively small amount of brake pedal travel. Brake fluid is forced from the large volume or quick take-up chamber around the lip of the primary piston seal into the high pressure chamber as the stroke of the master cylinder piston increases in the brake apply direction. Fluid pressure builds up in the quick take-up chamber to a point that causes the blow-off valve to open and permit passage of substantial quantities of fluid from the quick take-up chamber to the master cylinder reservoir. During the return stroke of the master cylinder piston, excess fluid that has passed from the quick take-up chamber is restored by the flow of fluid from the reservoir around the lip of a compensating seal valve. The blow-off valve is held in the closed position when the master cylinder is in the fully released or at-rest position, but the bypass orifice permits limited passage of brake fluid from the high pressure chamber and the quick take-up chamber into the master cylinder reservoir. Such passage may occur due to temperature changes of the brake fluid or parts of the brake system, for example, providing for delayed pressure equalization.

Figure 1:
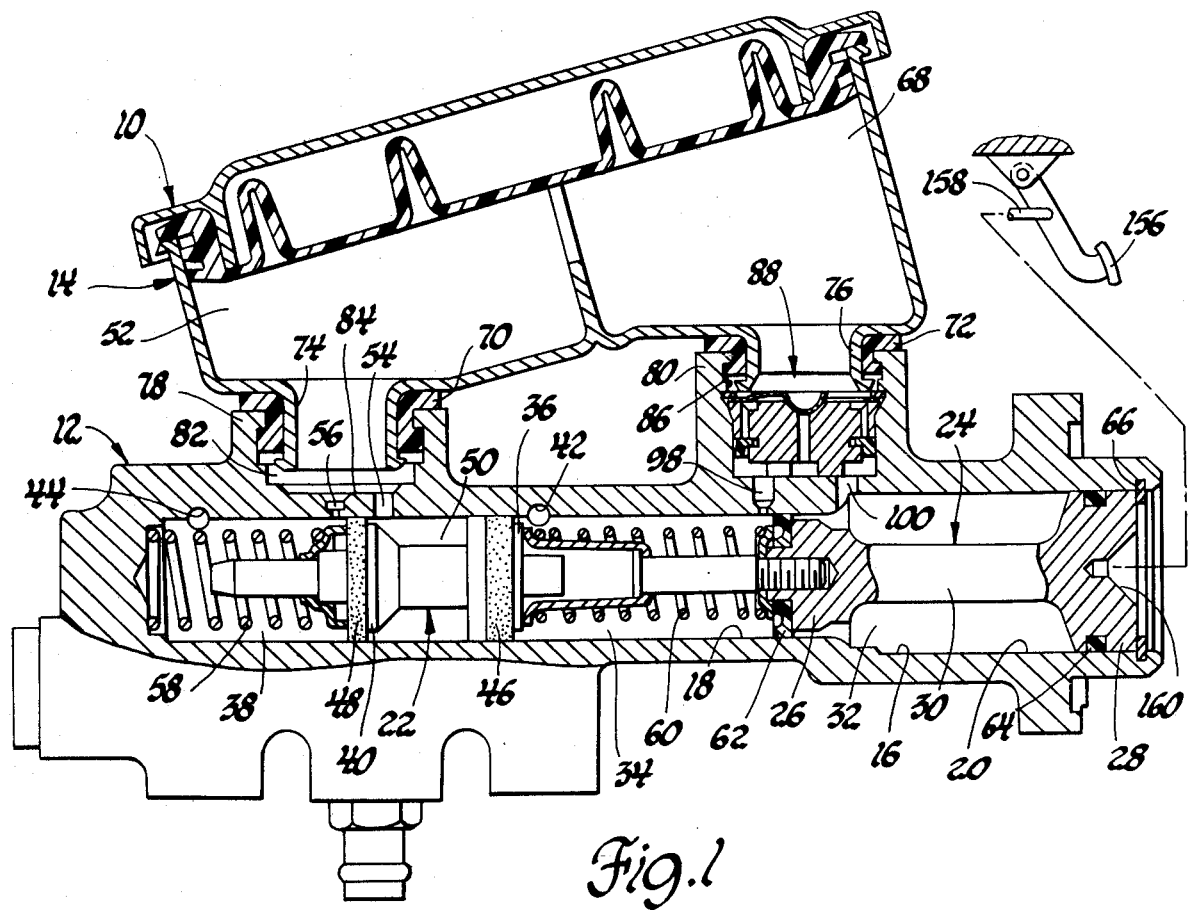
FIG. 1 is a side view of a master cylinder embodying the invention, with parts broken away and in section. The master cylinder is illustrated as being in the fully released position.

The master cylinder assembly 10 includes a housing 12 and a reservoir body 14. The housing has a stepped bore 16 formed therein with a smaller diameter forward section 18 and a larger diameter rear section 20. Since the master cylinder is shown as being of the dual circuit type, it is provided with two pressurizing pistons. The forward piston 22 is the secondary piston and is reciprocably received in the forward portion of bore section 18. The rear piston 24 is the primary piston and is a stepped piston. It has a forward piston head 26 formed as a piston land and reciprocably received in the rear portion of bore section 18. It has a rear piston head 28 formed as a land and reciprocably received in bore section 20. The piston heads 26 and 28 are joined by a reduced diameter section 30.

Piston 24 cooperates with bore 16 to define a high volume or quick take-up chamber 32 between piston heads 26 and 28. A high pressure pressurizing chamber 34 is defined by the rear part of bore section 18, piston head 26, and the rear end 36 of secondary piston 22. Another high pressure pressurizing chamber 38 is defined by the forward end 40 of secondary piston 22 and the forward end of bore section 18. An outlet 42 is provided in housing 12 to deliver brake fluid pressurized in chamber 34 to one brake circuit, and an outlet 44 is provided in housing 12 to deliver brake fluid from pressurizing chamber 38 to another brake circuit. Piston 22 has cup seals 46 and 48 respectively mounted on piston ends 36 and 40 in the usual manner. Cup seal 46 will prevent flow from chamber 34 past secondary piston end 36. Cup seal 48 will prevent fluid flow from pressurizing chamber 38 past piston end 40. The chamber 50 between the piston ends 36 and 40 is a compensation chamber which is continually connected to the brake fluid reservoir chamber 52 through compensation port 54. A compensation port 56 provides communication between pressurizing chamber 38 and reservoir chamber 52 when the secondary piston is in the fully released position shown in FIG. 1 so that cup seal 48 uncovers port 56. A piston return spring 58 is provided in chamber 38 and continually urges secondary piston 22 toward the released position. A piston return spring 60 in chamber 34 continually urges piston 24 toward the released position. Spring 60 is a caged spring, as is well-known in the art, which when extended to its permissible limit also establishes the release position of secondary piston 22.

A cup seal 62 is mounted on the forward side of piston head 26 of primary piston 24. Seal 62 is arranged to prevent fluid flow from pressurizing chamber 34 to quick take-up chamber 32, while acting as a check valve which permits fluid flow from chamber 32 to chamber 34 around the outer periphery of piston head 26 and the lip of cup seal 62 while pressure in chamber 32 is greater than pressure in chamber 34. A seal 64 is mounted on piston head 28 to seal the rear end of chamber 32. A piston stop 66 is provided in the open end of the enlarged bore section 20 and forms an abutment engaged by piston head 28 when the master cylinder is in the fully released position.

The reservoir body 14, in addition to fluid chamber 52 for the forward pressurizing chamber 38, has a fluid chamber 68 for the pressurizing chambers 32 and 34. The reservoir body is secured to the master cylinder housing by use of annular retaining and sealing means 70 and 72 which cooperate with short mounting tubes 74 and 76 formed as a part of reservoir body 14. The retaining and sealing means 70 and 72 and the mounting tubes 74 and 76 are respectively received in annular bosses 78 and 80 formed as a part of housing 12. Boss 78 has a recess 82 opening upwardly to receive retaining and sealing means 70 and mounting tube 74 and in open communication with chamber 52. Compensation ports 54 and 56 open through the bottom surface 84 of recess 82, as well as the side wall of bore section 18.

Figure 2:
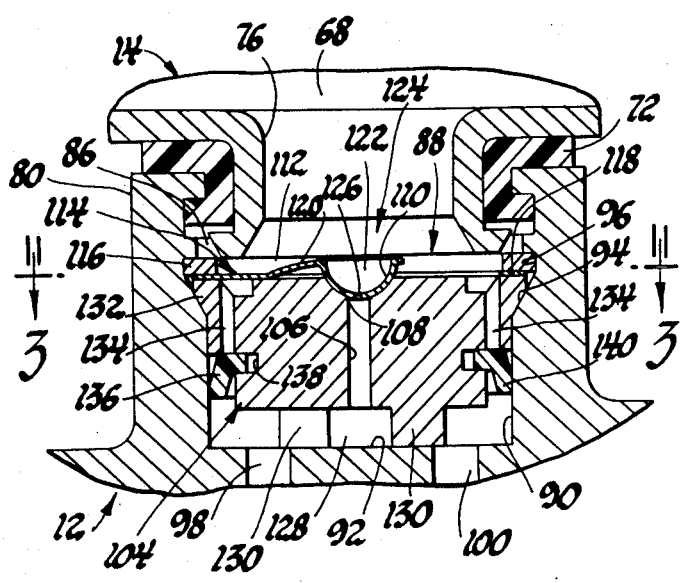
FIG. 2 is an enlarged view of the compensation control and blow-off unit of the master cylinder of FIG. 1, with parts broken away and in section.

Boss 80 has a recess 86 which similarly receives retaining and sealing means 72 and mounting tube 76. The lower portion of recess 86 is also a valve unit chamber receiving the compensation control and blow-off valve unit 88. This portion of the master cylinder assembly is in greater detail in FIG. 2. The lower portion of recess 86 forming the valve unit chamber has a side wall 90, a bottom surface 92, a beveled annular shoulder 94 and an annular groove 96 adjacent and above shoulder 94. Compensation port 98 is formed through bottom surface 92 and opens into the rear end of bore section 18. It is so positioned relative to the fully released position of cup seal 62 that it opens into pressurizing chamber 34, but is closed during the initial brake apply movement of piston 24 by the lip of cup seal 62. Compensation port 100 extends through bottom surface 92 and into the larger diameter quick take-up chamber 32.

Unit 88 includes a valve body 104 having a passage 106 formed axially through it. The upper end 108 of passage 106 opens into reservoir chamber 68 through mounting tube 76 and the upper portion of boss 80. The upper end 108 also defines a valve seat 110, which is formed much like a spherical socket. The valve seat and the chamber section 112 immediately above valve body 88 forms a valve chamber.

Figure 3:
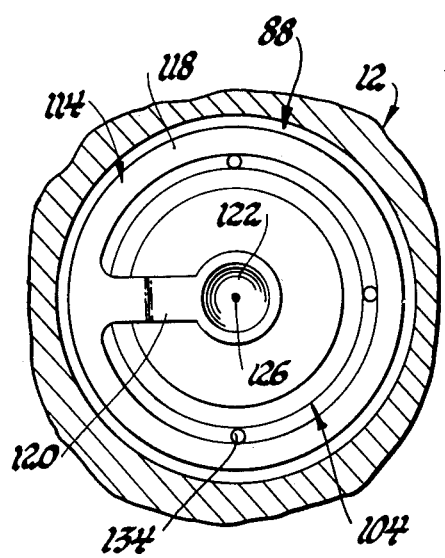
FIG. 3 is a cross section view with parts broken away and in section taken in the direction of arrows 3—3 of FIG. 2.

A valve and valve body retainer 114 is received immediately above the valve body and is held in place in the chamber formed in part by side wall 90 by a suitable device such as snap ring 116 in groove 96. The valve and retainer 114 is illustrated in plan view in FIG. 3 and in cross section in FIG. 2. It includes an annular retainer ring portion 118, a resiliently yieldable cantilever spring tongue portion 120, and a valve member portion 122. The spring tongue portion 120 extends inwardly from a part of the ring portion 118 and has the valve member portion 122 formed on its free end. The radially inner part of tongue portion 120 is bent out of the plane of the annular ring portion 118 and so arranged that the valve member portion 122 mates in valve closing relation with valve seat 110 to provide a normally closed check valve 124 for the upper end 108 of passage 106. A restricted flow passage 126 is formed through the valve member portion 122 and provides a continuously open passage between passage 106 and the reservoir chamber 68, restrictively bypassing the normally closed valve 124 between the reservoir 68 and the quick take-up chamber 32. Passage 126 provides a controlled leak which accommodates a delayed pressure equalization between the reservoir chamber 68 and the quick take-up chamber 32 under a static pressure condition.

Valve member 122 has its upper side exposed to fluid in the reservoir chamber 68 and its lower side continuously exposed to fluid in the quick take-up chamber of the master cylinder bore by way of compensation port 100 and a lower chamber 128 defined by the recessed bottom surface 92, the lower portion of recessed side wall 90, and the undersurface of the valve body 104. The valve body 104 may be provided with one or more castellated supports 130 to maintain chamber 128. A flange 132 is formed around the center part of the valve body 104 and is beveled to mate with shoulder 94 to axially and radially locate the valve body in the lower portion of recess 86. The snap ring 116 fits in groove 96 and over the annular retainer ring portion 118 so that they cooperate to hold the valve body in position against axial movement.

A series of circumferentially spaced passages 134 are formed to extend axially through flange 132 and generally axially parallel to the axis of the passage 106. A cup seal 136 is peripherally mounted in a groove 138 formed about the lower portion of valve body 104, which is smaller in diameter than the diameter of side wall 90. The lip 140 of cup seal 136 is sealingly engageable with the side wall 90. Passages 134 connect chamber 112 with the upper side of the cup seal 136 so that fluid may flow from chamber 68 through passages 134 and past cup seal lip 140 into chamber 128. Thus the cup seal acts as a valve permitting such flow while preventing flow in the reverse direction, and is a lip type compensating seal.

The master cylinder assembly 10 is arranged to be actuated by a vehicle operator through a brake pedal 156 and a push rod 158 which engages the rear end 160 of primary piston 24. Upon initial brake apply movement of piston 24, the volume of quick take-up chamber 32 decreases and fluid is pushed past cup seal 62 into chamber 34. The cup seal 62 moves to close off compensation port 98 so that pressure can be obtained in chamber 34. Since valve member 122 is seated on valve seat 110, fluid flow between quick take-up chamber 32 and reservoir chamber 68 through passage 106 is substantially prevented, with only a very small flow passing through the orifice-like passage 126. Thus pressurization of the fluid in chamber 32 can occur in a substantially undiminished manner. Fluid is being replaced from chamber 32 at a relatively large volume but low pressure. It flows past cup seal 62, into chamber 34 and through outlet 42 to the brake circuit connected to that outlet. The pressure also acts on the rear end 36 of secondary piston 22 to move that piston forwardly so that its cup seal 48 closes compensation port 56 and fluid pressurization begins in chamber 38. Fluid so pressurized goes through outlet 44 to the brake circuit connected with that outlet. In a brake system where disc brakes are used on the front vehicle wheels only, the disc brake actuating circuit would be connected to outlet 42, thus taking advantage of the high volume of fluid being delivered through that outlet to provide for quick take-up of the brake linings so that they move quickly to engage the brake discs.

The pressure generated in chamber 32 acts on the lower surface of valve member 122 across the effective area of end 108 at seat 110, while the upper side of the valve is exposed to reservoir pressure, which is usually substantially atmospheric pressure. As the pressure in chamber 32 increases, it reaches a point where the pressure differential acting on valve member 122 overcomes the spring closing force of the spring tongue portion 120, moving the valve upwardly. This fully opens passage 106 to reservoir chamber 68, fully communicating quick take-up chamber 32 with reservoir chamber 68. Once the valve member 122 moves upwardly so that it disengages from its valve seat 110, the pressure from chamber 32 acts on a greater portion of the lower surface of valve member 122, thereby permitting a reduction in pressure in the quick take-up chamber 32 without permitting closure of valve 124. By proportioning the area of the valve member 122 exposed to quick take-up pressure when the valve is closed relative to the total valve surface area, quick take-up pressure is permitted to drop substantially, for example, to approximately one-half of its blow-off pressure value at which valve 124 was opened, thereby substantially reducing the amount of brake pedal effort required to displace fluid from chamber 32 as the master cylinder is further actuated in the brake apply mode. Valve 124 will close when the pressure in chamber 32 approaches the pressure in reservoir chamber 68, with passage 126 providing for minor equalization. Further master cylinder actuation causes pressures to be generated in chambers 34 and 38 at a high rate relative to the amount of stroke since the brake circuits no longer require any appreciable fluid volume. The pressurization then depends primarily on the brake force exerted without requiring much brake pedal travel.

Upon brake release, pistons 22 and 24 move rightwardly as seen in FIG. 1. Any required compensating fluid for chamber 38 will flow through port 54 from reservoir chamber 52 to chamber 50 and past cup seal 48. At the same time, fluid is flowing from the brake circuit through outlet 44 into chamber 38. Fluid required for compensation also pressurizing chamber 34 will flow from reservoir chamber 68 through chamber 112, passage 134, past lip 140 of cup seal 136, and through lower chamber 128 to compensation port 98. The fluid will then flow past cup seal 62 into chamber 34. Fluid flowing through compensation port 100 also flows into quick take-up chamber 32. This chamber requires a relatively large amount of compensating fluid since the volume of chamber 32 increases rapidly upon brake release. The passages and chambers provided are sufficient for this purpose.

As the master cylinder reaches its fully released position, secondary piston cup seal 48 will open compensation port 56 so that pressurizing chamber 38 is directly connected through that port to reservoir chamber 52. Cup seal 62 will open compensation port 98 so that pressurizing chamber 34 is directly connected to lower chamber 128. Any temperature changes requiring fluid compensation after the brakes have been released are readily permitted since both pressurizing chambers 34 and 38 have open lines of fluid communication with the reservoir chambers of the reservoir body directly through their associated compensation ports, with compensation port 98 being in fluid communication with reservoir chamber 68 through orifice passage 126.

The embodiments of the invention in which an exclusive property or privilege is claimed are defined as follows:

1. In a master cylinder having a fluid reservoir, a master cylinder body with a stepped bore formed therein, a mating stepped piston received in said bore and actuatable therein in apply and release modes, said bore and said piston defining a large diameter low pressure high volume displacing pressurizing first chamber and a smaller diameter high pressure low volume displacing pressurizing second chamber, and a valve chamber formed in said master cylinder body with a side wall and a bottom surface and a top opening into said reservoir, said bottom surface having first and second compensation ports extending therethrough and into said bore, said first compensation port being continually connected only with said first chamber of said bore and said second compensation port being connected only with said second chamber of said bore when said piston is in the fully released position of said release mode, an improved compensation control and blow-off unit valve assembly operable during the apply mode of said piston to selectively vent said first chamber and comprising:
    a valve body having a lip type compensating seal extending about the outer periphery thereof and in sealing contact with said valve chamber side wall to permit fluid flow between said valve body and said valve chamber side wall in one direction only;
    said valve body having a passage extending axially therethrough and connecting said reservoir and the portion of said valve chamber between said valve body and said valve chamber bottom surface and having a normally closed check valve cooperating therewith which when closed prevents unrestricted flow from said reservoir through said passage to said compensation ports when said piston is in either apply or release modes;
    and means comprising a unitary valve body retainer and a check valve spring and a valve member forming the movable part of said check valve, said means being formed respectively by a circumferentially closed annular retainer ring operatively engaging said valve body and said valve chamber side wall to hold said valve body in a fixed position in said valve chamber, a cantilevered spring extending radially inwardly from said ring and terminating with its free end positioned centrally within said ring, and said valve member being formed on the free end of said cantilevered spring and cooperating with a valve seat formed by the one end of said valve body passage opening toward said reservoir to define said check valve;
    and a continuously open restricted flow passage formed through said valve member and bypassing said check valve between said reservoir and said first chamber and providing a controlled leak accommodating a delayed pressure equalization between said reservoir and said first chamber under static pressure conditions;
    said check valve opening in response to a predetermined blow-off pressure generated in said first chamber during pressure generating actuation of said piston from said fully released position in said apply mode to vent said first chamber to said reservoir.

2. In a master cylinder having a fluid reservoir, a master cylinder body with a bore formed therein, a mating piston received in said bore and actuatably cooperating therewith in apply and release modes, said bore and said piston defining a low pressure high volume displacing pressurizing first chamber and a high pressure low volume displacing pressurizing second chamber, and wall means forming a valve chamber communicating with the bore in said master cylinder body through first and second compensation ports and opening into said reservoir, said first compensation port being continually connected only with said first chamber of said bore and said second compensation port being connected only with said second chamber of said bore when said piston is in the fully released position of said release mode, an improved compensation control and blow-off unit valve assembly operable during the apply mode of said piston to selectively vent said first chamber and comprising:

a check valve and a valve body insertable into said valve chamber to form therewith a chamber portion communicating with said compensation ports, said valve body defining a valve seat for said check valve and having a lip type compensating seal extending about the outer periphery thereof between said valve seat and said chamber portion and in sealing contact with said valve chamber wall means to permit fluid flow between said valve body and said wall means in one direction only;

said valve body having a passage including said valve seat extending therethrough for connecting said reservoir and said chamber portion, said check valve being normally closed with respect to said valve seat and said passage to prevent unrestricted flow from said reservoir through said passage to said compensation ports when said piston is in the release mode;

and unitary means for retaining said valve assembly in said valve chamber and for supporting said check valve, said unitary means comprising an annular valve body retainer having a check valve spring portion extending radially inwardly in cantilever fashion to said check valve for supporting same for movement with respect to said valve seat, said annular valve body retainer further including an annular retainer ring portion operatively engaging said valve body and said wall means to hold said valve body in a fixed position in said valve chamber;

and means forming a continuously open restricted flow passage bypassing said check valve when said check valve is closed to provide a controlled leak between said reservoir and said first chamber, thereby accommodating a delayed pressure equalization between said reservoir and said first chamber under static pressure conditions;

said check valve opening in response to a predetermined blow-off pressure generated in said first chamber during pressure generating actuation of said piston in said apply mode to vent said first chamber to said reservoir after said second compensation port is no longer in communication with said second pressurizing chamber.

3. In a master cylinder having a fluid reservoir, a stepped bore, and a mating stepped piston reciprocably received in said bore, said piston and said bore defining a large diameter low pressure high volume displacing first pressurizing chamber and a smaller diameter high pressure low volume displacing second pressurizing chamber, a valve chamber having an upper end in open fluid communication with said reservoir and a lower end having a first port opening into said first pressurizing chamber and a second port opening into said second pressurizing chamber, a valve body mounted in said valve chamber and having an upper end continuously exposed to fluid in said reservoir, a lower end continuously exposed to said first and second ports, and first and second valve passage means extending between and through said valve body upper and lower ends, and a fluid flow sensitive first valve permitting fluid flow therepast from said reservoir to said first chamber through said first valve passage means and preventing fluid flow therepast in the reverse direction, the improvement comprising:

a unitary valve and valve body retainer formed to provide an annular retainer ring portion and a resiliently yieldable cantilever spring tongue portion extending radially inwardly from said ring and a valve member portion formed on the free end of said tongue portion;

said retainer ring portion fitting within said valve chamber in axially fixed relation and acting on said valve body to hold said valve body against axial movement in said valve chamber, said valve portion overlying the end of said second valve passage means and cooperating therewith to define a second valve with said yieldable spring tongue portion continuously urging said second valve closed, and a continuously open restricted flow passage formed through said valve portion bypassing said second valve between said reservoir and said first chamber and providing a controlled leak accommodating a delayed pressure equalization between said reservoir and said first chamber under a static pressure condition, said second valve having one side exposed to fluid in said reservoir and another side continuously exposed to fluid in said first chamber of said bore and selectively exposed to fluid in said second chamber of said bore;

said second valve being opened only at a predetermined pressure in the fluid at said valve body lower end and acting on said second valve against the urging of said yieldable spring tongue portion;

said second valve including an area exposed to fluid in said first chamber and responsive to a predetermined pressure differential between a higher fluid pressure generated in said first chamber during master cylinder actuation and the lower fluid pressure of said reservoir to open said second valve against the urging of said yieldable spring tongue portion to relieve pressure in said first chamber;

pressure generated in said first chamber during master cylinder actuation therefore being limited so that the master cylinder actuating force is not required to continuously overcome a continuously increasing pressure generated in said first chamber during full master cylinder actuation.

* * * * *